United States Patent [19]

Grossiord

[11] Patent Number: 4,787,329
[45] Date of Patent: Nov. 29, 1988

[54] DEVICE FOR DETECTION OF IMMINENT GAS DEPLETION OF A LIQUIFIED GAS TANK AND GAS LIGHTER EQUIPPED WITH THIS DEVICE

[75] Inventor: Claude R. Grossiord, Annecy, France

[73] Assignee: S. T. Dupont Company, Paris, France

[21] Appl. No.: 57,054

[22] PCT Filed: Sep. 10, 1986

[86] PCT No.: PCT/FR86/00300

§ 371 Date: May 6, 1987

§ 102(e) Date: May 6, 1987

[87] PCT Pub. No.: WO87/01801

PCT Pub. Date: Mar. 26, 1987

[30] Foreign Application Priority Data

Sep. 11, 1985 [FR] France ............... 85 13496

[51] Int. Cl.$^4$ ........................... G01F 23/02
[52] U.S. Cl. ..................... 116/227; 73/290 R; 73/327; 116/DIG. 5
[58] Field of Search ........... 73/290 R, 293, 327; 116/109, 227, DIG. 5

[56] References Cited

U.S. PATENT DOCUMENTS

| | | | |
|---|---|---|---|
| 773,154 | 10/1904 | McFerran | 116/227 |
| 2,605,634 | 8/1952 | Lewis | 73/290 R |
| 3,152,723 | 10/1964 | Perl et al. | 116/227 |
| 3,319,597 | 5/1967 | Schnitzius et al. | 116/227 |
| 3,345,870 | 10/1967 | Yoshinaga | 73/327 |
| 3,364,733 | 1/1968 | Holdsworth | 73/327 |
| 3,448,618 | 6/1969 | Lomolino | 116/DIG. 5 |
| 3,528,291 | 9/1970 | Melone | 116/227 |
| 3,535,934 | 10/1970 | Rapata | 116/227 |
| 3,568,628 | 3/1971 | Erickson | 116/227 |
| 3,796,098 | 3/1974 | Trayer | 116/DIG. 5 |

FOREIGN PATENT DOCUMENTS

| | | | |
|---|---|---|---|
| 156489 | 12/1951 | Australia | 116/227 |
| 2524980 | 10/1983 | France . | |
| 58-26226 | 2/1983 | Japan | 73/293 |

Primary Examiner—Steven L. Stephan
Assistant Examiner—Thomas B. Will

[57] ABSTRACT

The subject of the invention is a device for the detection of imminent gas depletion of a liquified gas tank, comprising a bundle of fiber optics (22), one end of which, forming an observation surface is visible from the outside of the tank, and other end of which, placed inside of the tank, is in optical contact with a flat surface of a transparent element (20), comprising, on its opposite surface, at least one dioptricelement (26). According to the invention, the lateral walls of the element (26) form with said surface an angle, preferably obtuse, the dimensions of which are such that it is capable, as long as there is liquid gas remaining in the reservoir, of being covered, almost totally, by a meniscus formed of a liquid gas condensate, which thus prevents any total reflection on said surface, of the rays directed by the fiber beams.

8 Claims, 2 Drawing Sheets

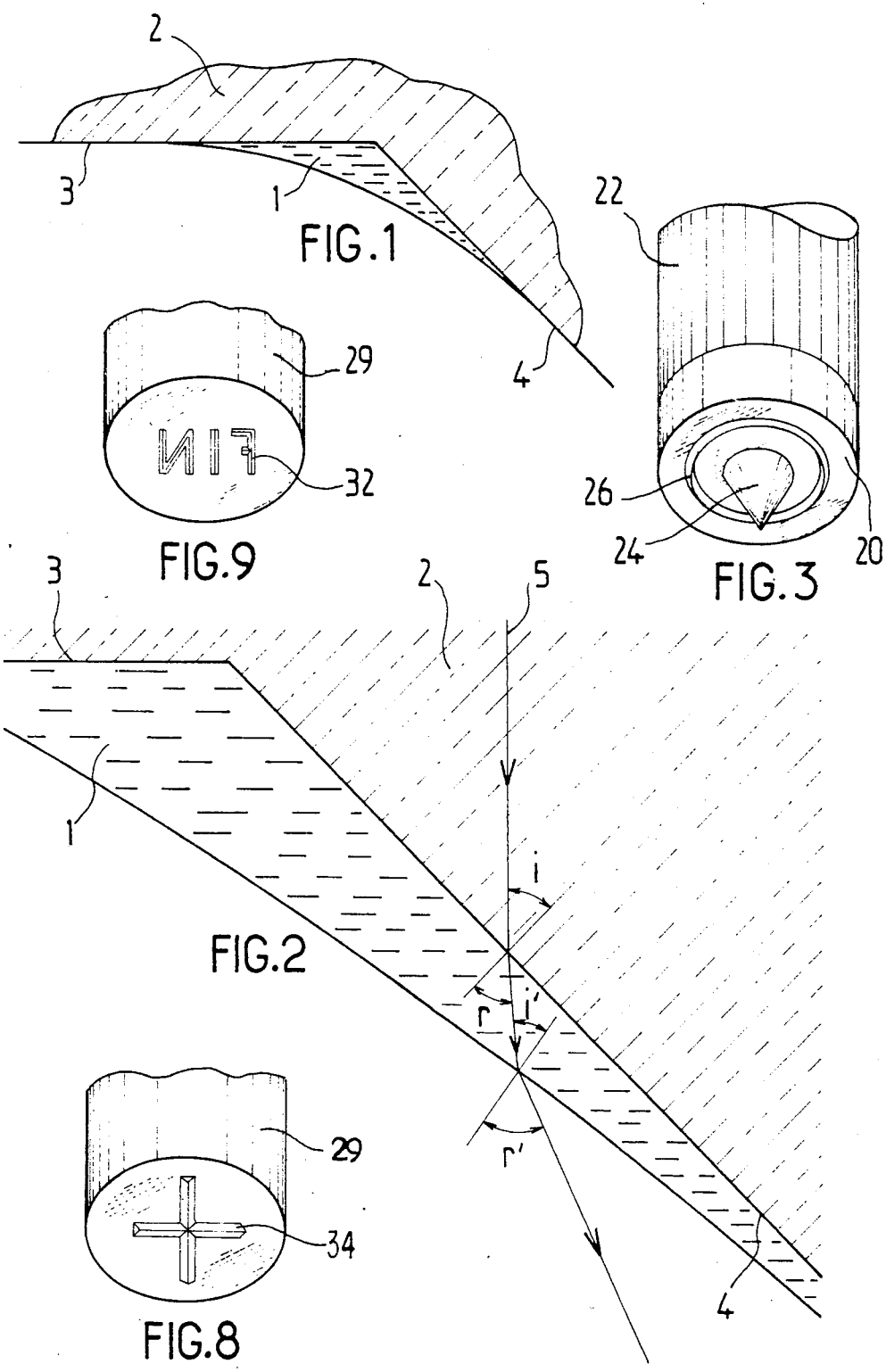

DEVICE FOR DETECTION OF IMMINENT GAS DEPLETION OF A LIQUIFIED GAS TANK AND GAS LIGHTER EQUIPPED WITH THIS DEVICE

FIELD OF THE INVENTION

This invention concerns a device that is capable of detecting the imminence of gas depletion in a luquified gas tank. It also concerns a refillable gas lighter equipped with this device.

DESCRIPTION OF THE PRIOR ART

In its French patent application No. 2,524,980, the Applicant has described a device for detecting a liquid level in a tank, this device comprising a transparent element, one end of which is placed in said tank at the level to be detected, has a refractive index such that the light rays which are propagated there are refracted at the interface when this is immersed in the liquid, and in the opposite case, they are reflected by total reflection. In this device, the transparent element consists of a fiber optic bundle, and the end placed approximately at the level to be detected consists of a transparent unit, one flat surface of which is applied against a first end of said fiber bundle, and the other surfaces of which are such that the incident rays transmitted by the bundle can be subject to at least one total reflection there and be transmitted in the reverse direction by this bundle to its second end when the transparent unit is not immersed. The second end of the fiber bundle is attached to one of the walls of the tank, in a manner such that it is visible from the outside or inside of the latter.

Such device can, in particular, be used to advantage in a gas lighter, to ascertain whether the level of liquified gas, in the tank, has gone down below a certain threshold. However, it does not make it possible to determine with sufficient accuracy from what moment only a quantity of gas remains in the tank corresponding to a few lightings by the gas lighter, for example, about ten, so as to warn the user of the imminent depletion of the gas, so that he can refill his lighter.

SUMMARY OF THE INVENTION

The purpose of this invention is to remedy this disadvantage by improving the previously patented device such that it is possible to detect the imminent depletion of the gas in the tank.

The invention is based on the known fact that, when a vessel contains a liquified gas, the walls of the vessel are covered, due to a condensation phenomenon, with a thin film of gas in the liquid phase, such that, a meniscus of liquid tends to form in the sections forming a reflex angle.

If, inside of the tank, the external surface of the transparent unit of the device of the prior art comprises a reflex angle, the pathway of the incident light rays being displaced in parallel with the fiber bundle will be modified by the presence of the layer of liquid in that angle. In fact, instead of being subject to a total reflection on that surface, as would be the case in the absence of liquified gas on the outside, the corresponding light rays will pass through that surface, enter the meniscus of liquid gas, be refracted there in order to come out again and be lost inside of the tank.

On the observation surface of the fiber optic bundle (end of this bundle placed on the outside of the tank), the area corresponding to these rays, and consequently, to the meniscus of liquified gas will thus be dark. It will remain so as long as there is still liquid gas in the tank and will become light only when the liquid phase disappears, which will constitute a signal to the user that the end of the gas is imminent, and will indicate to him that it is time to refill the tank of his lighter.

According to the invention, the observation surface of the fiber optics bundle, which is situated at the outside end of the tank will thus contain at least one area which will be lighted only when the tank is drained of gas in the liquid phase.

Consequently, the subject of the invention is a device for detecting the imminent gas depletion of a tank of liquified gas, comprising a bundle of fiber optics, one end of which constitutes the observation surface, is visible from the outside of the tank, and the other end, which is placed inside of the tank, is in optical contact with a flat surface of a transparent element, including, on its opposite surface, at least one dioptric element, the lateral walls of which form an angle, preferably obtuse, with said surface, and the dimensions of which are such that, as long as there is still liquid gas in the tank, it is capable of being covered, almost totally, by a meniscus formed from a liquid gas condensate, which thus prevents any total reflection, on said surface, of the rays directed by the fiber bundle.

Of course, the transparent unit can have any desired form, depending on the form of the desired optical signal, the appearance of which will indicate to the observer that depletion of the gas in the tank is imminent.

BRIEF DESCRIPTION OF THE DRAWINGS

The attached drawings illustrate the theory and certain embodiments of the invention. In these drawings:

FIG. 1, illustrates the formation of a meniscus of liquified gas in an angle of a transparent unit.

FIG. 2 illustrates the phenomenon of double refraction of the light rays resulting from the presence of this meniscus.

FIG. 3 illustrates, in perspective, one form of implementing the invention.

FIGS. 8 and 9 are schematic views in perspective illustrating different forms of implementing the invention.

DESCRIPTION OF THE PREFERRED EMBODIMENTS

Figure 5:
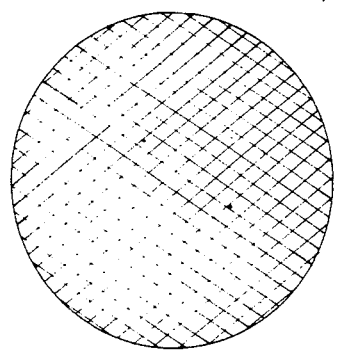
FIGS. 5, 6 and 7 illustrate different positions of this device with respect to the bottom of a tank containing liquified gas, and FIGS. 5', 6' and 7' represent the corresponding signals that appear on the observation surface of the fiber optic bundle.

FIG. 1 shows the meniscus 1 of liquid gas which is formed on a transparent unit 2 having two connecting surfaces 3 and 4 forming an angle $\alpha$ (here an obtuse angle of ca. 135°), when this transparent unit is placed in a tank containing a gas in liquid phase.

As can be seen in FIG. 2, which is a larger scale view of the connecting portion of surfaces 3 and 4, the presence of the meniscus 1 modifies the pathway of the light rays 5, which are propagated in the transparent unit. In fact, instead of being reflected on surface 4 of this unit, by total reflection, on the "transparent material-gas phase" diopter, rays 5 which reach an angle of incidence i on surface 4 enter the meniscus of liquified gas 1 while being deflected along an angle of refraction r. Then, at an angle of incidence i', they meet the "liquid phase-gas phase" diopter, on which they are refracted along an angle r', then to be lost inside of the tank.

In fact, the index of a transparent solid material with respect to air is generally within a range of 1.4 to 1.6, and methyl methacrylate, which is marketed under the name PLEXIGLASS, for example, has an index with respect to air or to the gas phase, of 1.49, while the refractive index of butane is 1.35, and that of propane 1.29. Thus, the total angle of total reflection $\lambda$ for different diopters will be as follows:

| Diopter | $\lambda$ |
| --- | --- |
| Plexiglass-liquid propane | 60° |
| Plexiglass-liquid butane | 65° |
| Plexiglass-butane gas | 42° |
| Liquid butane-butane gas | 47.7° |
| Liquid propane-propane gas | 50.8° |

As shown in FIG. 2, if the "Plexiglass-liquid gas" diopter formed at surface 4 of transparent unit 2 is inclined to 45° with respect to the axis of the fiber optics bundle, the angle of incidence i (45°) is less than the critical angle for the "Plexiglass-liquid butane or propane" interface (65° and 60°, respectively). Thus, there is not total reflection, but refraction.

It will be noted that, if there were no meniscus of liquid gas 1, the angle of incidence i (45°) would be greater than the critical angle for the "Plexiglass-butane" or "Plexiglass-propane gas" interface ($\simeq$42°), and then, there would be total reflection.

Then, the rays meet the secone diopter ("liquid butane or propane-butane or propane gas") under an incident angle i'. There will no longer to total reflection, because depending on the position of the light rays, taking into consideration the concavity of this second diopter, all of the incident rays i' will be less than 45° (the latter value being reached, theoretically, at the tangential point of meniscus 1 with surface 4), and thus in all cases, will be less than the critical angle $\lambda$ (the value of which for the "liquid butane-butane gas" interface is 47.7°, and for the "liquid propane-propane gas" interface, it is 50.8°).

It is thus clear that the presence of liquid meniscus 1 causes refraction of incident rays 5, which is then represented by a dark area on the observation surface formed by the end of the fiber bundle situated on the outside of the lighter.

Consequently, if the transparent unit end and the fiber optics bundle with one end of which it is in optical contact are placed in a tank of liquified gas, by examining the observation side of the fiber bundle a user could find that:

as long as the transparent unit is immersed in the liquid phase, all of the incident light rays carried to the latter by the fiber optics bundle will enter the liquified gas, and no light signal will appear on the observation surface of the fiber bundle, where only a dark spot will be distinguished;

when the diopter is no longer immersed in the liquid phase, but there is still gas in the liquid phase in the tank, the incident light rays will be reflected by the surface of surfaces of the transparent unit in contact with the gas phase, but not the rays which meet the liquid phase meniscus or meniscuses formed in the angles of the transparent unit; the observer will then note a light signal of a specific form corresponding to that of the transparent unit, surrounded by a dark zone or zones, at the liquid meniscus(es);

when the tank contains practically no more liquified gas, but essentially a gas phase, the dark areas surrounding the light signal will disappear and will be replaced by light areas, thus warning the observer that it is time to refill the tank.

Figure 4:
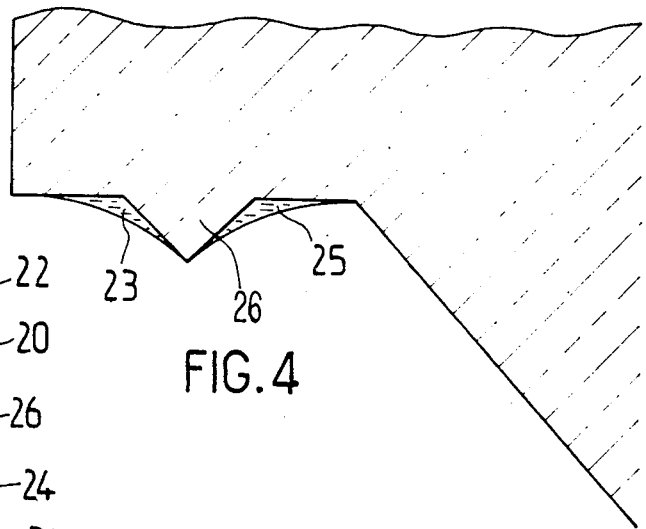
FIG. 4 is a larger scale detail cross section of this form of embodiment.
Figure 5:
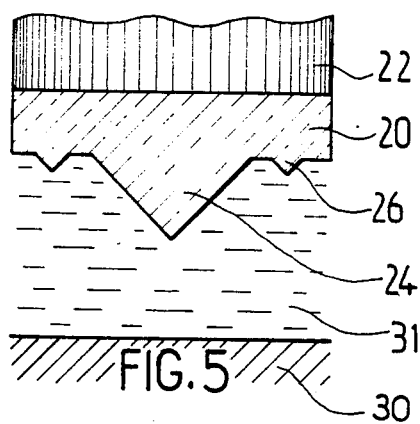

In FIGS. 3 to 7, the transparent unit 20 in contact with a fiber optics bundle 22 consists of a Plexiglass cylinder, which has in the center of its bottom surface a first dioptric element 24 which is conical in shape and has a 90° angle at the apex. It also comprises a second annular dioptric element 26 with a triangular profile and a 90° angle at the apex. The diameter of transparent unit 20 and the height of conical dioptric element 24 are a function of the size of the dimension of the desired signal. The height to be given to the second annular dioptric element 26 will depend on the type of transparent material forming unit 20 and on that of the gas used. The Applicant has established that in the case of Plexiglass and butane, a height of 0.2 mm makes it possible to obtain, as shown in FIG. 4, two meniscuses 23 and 25, which totally cover dioptric element 26.

Figure 7:
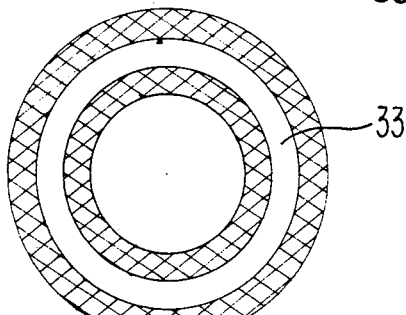
Figure 6:
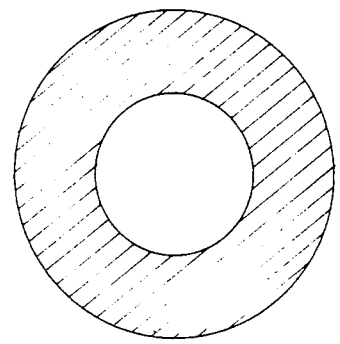
Figure 7:
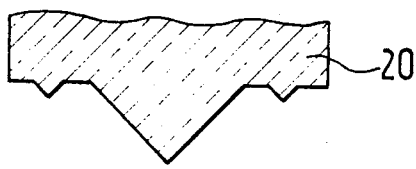
Figure 6:
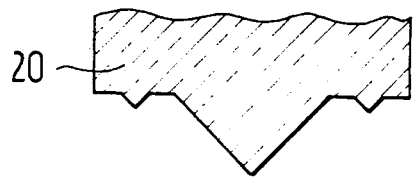

Thus, when transparent unit 20 is completely immersed in the liquid gas 31 of the tank 30 (FIG. 5), the observation surface will be completely dark (FIG. 5'); when there is still a little liquid gas (FIG. 6), the observation surface will present a central luminous circle (FIG. 6'), and finally, when there is no longer any liquid gas in tank 30 (FIG. 7), a light signal 33 will appear corresponding to a total reflection of the light rays on dioptric element 26 (FIG. 7'). This signal will inform the user that his lighter should be refilled.

FIGS. 8 and 9 show transparent units 29 provided with different forms of dioptric elements.

In the case of FIG. 8, dioptric element 34 is in the form of a cross, while in FIG. 9, it reproduces, in reverse, the letter of the work END, which will thus appear to the observer as a signal that the end of the gas is imminent.

The invention thus provides a simple and easy means to be used to determine the imminent gas depletion of a tank of liquified gas, which moreover, is particularly applicable to a refillable gas lighter, in order to indicate to a user that it is time to refill his liquified gas tank.

What is claimed is:

1. A device for detecting the imminent depletion of gas in a gas tank for liquified gas, said device comprising:

a tank adapted to hold liquified gas;

a fiber optic bundle, said bundle having two ends, one end of which forms an observation surface and is viewable from the exterior of said tank and the other end of which has a flat surface and is disposed inside of said tank;

a transparent element having at least two surfaces, one of which is flat, the flat end of said transparent element being disposed against the flat end of said fiber optic bundle and in optical contact therewith; and at least one dioptric element disposed on the other surface of said transparent element, said dioptric element having lateral walls which form an angle, preferable obtuse, with said other surface of said transparent element, the dimensions of said dioptric element being such that it is capable of being covered nearly completely by a meniscus formed of a liquid gas condensate, so long as there is gas remaining in said tank, said meniscus thus preventing any total reflection of the rays directed thereto by the fiber optic bundle.

2. The detection device according to claim 1 wherein the transparent element comprises at least one second dioptric element on said other surface, the dimensions of said second dioptric element being sufficiently large so that the dimensions of said meniscus are negligible compared to its own dimensions.

3. The device according to claim 1 wherein the dioptric element has a straight section that is perpendicular to said flat surface and is in the form of an isosceles triangle with a 90° angle at the apex.

4. The detection device according to claim 2 wherein the at least on second dioptric element is in the shape of a cone.

5. The detection device according to claim 1 wherein the dioptric element is in the shape of a crown.

6. The detection device according to claim 1 wherein the dioptric element is in the shape of a cross.

7. The detection device according to claim 1 wherein the dioptric element is in the form of one or more alphanumeric symbols.

8. The detection device according to claim 1 wherein said tank is the tank of a refillable gas lighter.

* * * * *